(12) United States Patent
Lokkinen

(10) Patent No.: US 10,302,238 B2
(45) Date of Patent: May 28, 2019

(54) LINING DRUM

(71) Applicant: Innotia Eesti Oü, Tallinn (EE)

(72) Inventor: Mika Lokkinen, Porvoo (FI)

(73) Assignee: Innotia Eesti Oü, Tallinn (EE)

( * ) Notice: Subject to any disclaimer, the term of this patent is extended or adjusted under 35 U.S.C. 154(b) by 224 days.

(21) Appl. No.: 15/482,731

(22) Filed: Apr. 8, 2017

(65) Prior Publication Data

US 2018/0292041 A1   Oct. 11, 2018

(51) Int. Cl.
| | |
|---|---|
| B29C 73/00 | (2006.01) |
| B29C 65/00 | (2006.01) |
| B29C 65/78 | (2006.01) |
| B32B 7/08 | (2019.01) |
| B32B 43/00 | (2006.01) |
| B32B 37/00 | (2006.01) |
| B32B 41/02 | (2006.01) |
| B65B 7/00 | (2006.01) |
| B65C 3/26 | (2006.01) |
| B65C 9/40 | (2006.01) |
| E04B 2/00 | (2006.01) |
| E04F 13/00 | (2006.01) |
| G05G 15/00 | (2006.01) |
| F16L 55/18 | (2006.01) |
| B29C 63/00 | (2006.01) |

(Continued)

(52) U.S. Cl.
CPC ........... F16L 55/18 (2013.01); B29C 63/0073 (2013.01); B65H 75/40 (2013.01); B65H 75/4471 (2013.01); F16L 55/165 (2013.01); B29C 63/34 (2013.01); B29C 66/006 (2013.01); B29C 66/301 (2013.01); B29C 66/5221 (2013.01); B29L 2023/22 (2013.01); B65H 2701/33 (2013.01); F16L 55/1651 (2013.01)

(58) Field of Classification Search
CPC ..... F16L 55/165; F16L 55/1651; F16L 55/18; B29C 63/34; B29C 63/36; B29C 63/0073; B29C 65/48; B29C 65/483; B29C 65/7858; B29C 65/7888; B29C 66/006; B29C 66/0062; B29C 66/301; B29C 66/5221; B29C 66/242; B29C 66/24221; B29C 66/612; B29C 66/632; B29C 66/874; B29C 66/8742; B29C 66/9241
USPC .. 156/60, 69, 71, 91, 92, 94, 156, 285, 287, 156/293, 294, 304.1, 304.2, 304.3, 349, 156/350, 360, 365, 423; D7/371, 679; 220/592.13; 62/342; 366/605
See application file for complete search history.

(56) References Cited

U.S. PATENT DOCUMENTS

| | | | | |
|---|---|---|---|---|
| 2,585,334 | A * | 2/1952 | McCauley | B01F 7/1695 |
| | | | | 220/326 |
| 6,336,740 | B1 * | 1/2002 | Keough | B01F 7/1695 |
| | | | | 220/238 |
| 2005/0056154 | A1 * | 3/2005 | Fu | A47J 36/165 |
| | | | | 99/323.5 |

* cited by examiner

Primary Examiner — Philip C Tucker
Assistant Examiner — Brian R Slawski
(74) Attorney, Agent, or Firm — Fasth Law Offices; Rolf Fasth

(57) ABSTRACT

A lining drum which has a tubular body having open ends, an inlet for compressed air and an outlet for liner is disclosed. The lining drum has end pieces removably attached to the tubular body for closing the open ends of the tubular body, a rotatable shaft inside the tubular body and a crank for rotating the shaft. The end piece has a spring-loaded flange mounting, wherein bias of springs pushes the flange mounting towards the tubular body and a closed position of the flange mounting, and air pressure inside the lining drum pushes the flange mounting away from the tubular body and towards an open position of the flange mounting.

7 Claims, 5 Drawing Sheets

(51) Int. Cl.
*F16L 55/165* (2006.01)
*B65H 75/40* (2006.01)
*B65H 75/44* (2006.01)
*B29C 63/34* (2006.01)
*B29L 23/00* (2006.01)

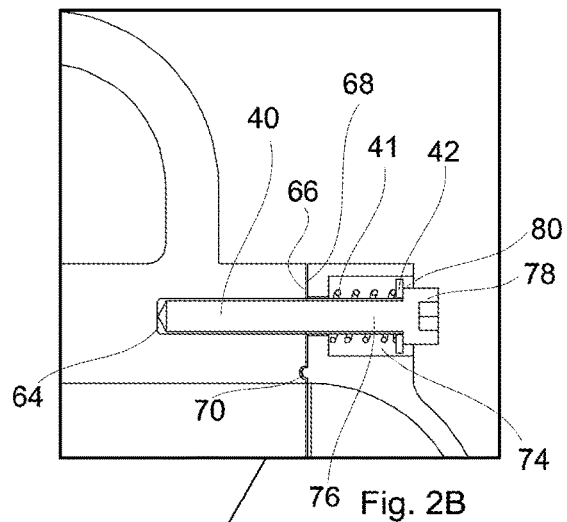
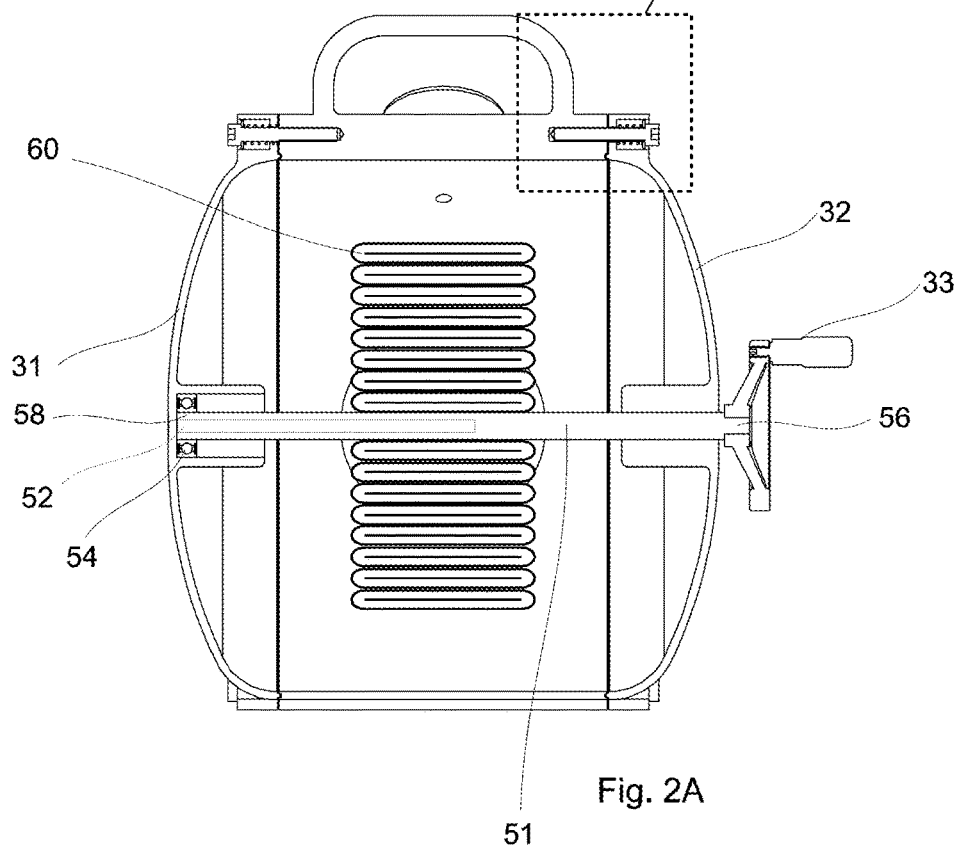
Fig. 2A
Fig. 2B

LINING DRUM

FIELD OF THE INVENTION

The present invention relates to a lining drum for renovating pipelines and particularly for installing a liner in an existing pipe.

BACKGROUND AND SUMMARY OF THE INVENTION

Installed pipelines in buildings and underground can be rehabilitated without opening structures or digging the ground. The trenchless rehabilitation enables a quick and durable rehabilitation of pipes within buildings and underground pipelines. A resin impregnated liner is installed in a pipe with an inversion drum by using air pressure to invert the liner into the pipe. Typically, a plastic-coated polyester felt tube, i.e. the liner, is first impregnated with a synthetic resin. The impregnated liner is closed at one end and wound up inside a lining drum around a shaft. The open end of the liner is fastened around an outlet of the lining drum. When pressurized air is supplied to the lining drum, the liner, due to the influence of air pressure, starts to protrude inside the lining drum, and the protruding liner is directed into the pipe to be renovated by unwinding the liner from the shaft by rotating the shaft so that the liner starts to extend through the outlet of the lining drum.

Once the liner is installed, air pressure is maintained on an elevated level until the resin within the liner settles and the liner forms a rigid pipe against the inner surface of the old pipe. The lining drums of the prior art have been welded together from several metal parts. The liners can typically withstand pressures from 80 kPa to 200 kPa inside the liner without rupture when the liner is in an open space. In a confined space, the liner does not have space to expand or rupture. Therefore, the pressure can rise much higher than the above pressure interval. For these scenarios, the lining drums have been equipped with a safety valve which opens when the air pressure inside the lining drum reaches 100-300 kPa, depending on the lining drum. Typical output from an air compressor that feeds the lining drum is in a range of 800-1000 kPa. Usually a pressure regulator is used between the air compressor and the lining drum as a third safety feature in addition to the safety valve in the liner itself.

One problem associated with the above prior art arrangement is that even the three independent safety features do not prevent explosions of the lining drum due to the excessive pressure that builds up inside the lining drum. A liner that is tangled inside the lining drum can block both the outlet and the safety valve. An explosion of the lining drum is a potentially a lethal accident and must be avoided at all cost.

One object of the present invention is to provide a low-pressure lining drum that is safer to use than the lining drums of the prior art because the structure of the lining drum does not allow an excessively or dangerously high pressure to build up inside the lining drum.

One advantage of the arrangement of the present invention is that the device is safe to use due to the pressure relief arrangement that cannot be blocked by the liner from the inside of the device.

BRIEF DESCRIPTION OF THE DRAWINGS

In the following, the present invention is described in greater detail by means of preferred embodiments with reference to the accompanying drawings, in which

FIG. 2A is an elevational section view of the lining drum according to the present invention in a closed position;

FIG. 2B is a detailed view of the section view of FIG. 2A;

DETAILED DESCRIPTION OF THE INVENTION

Figure 1:
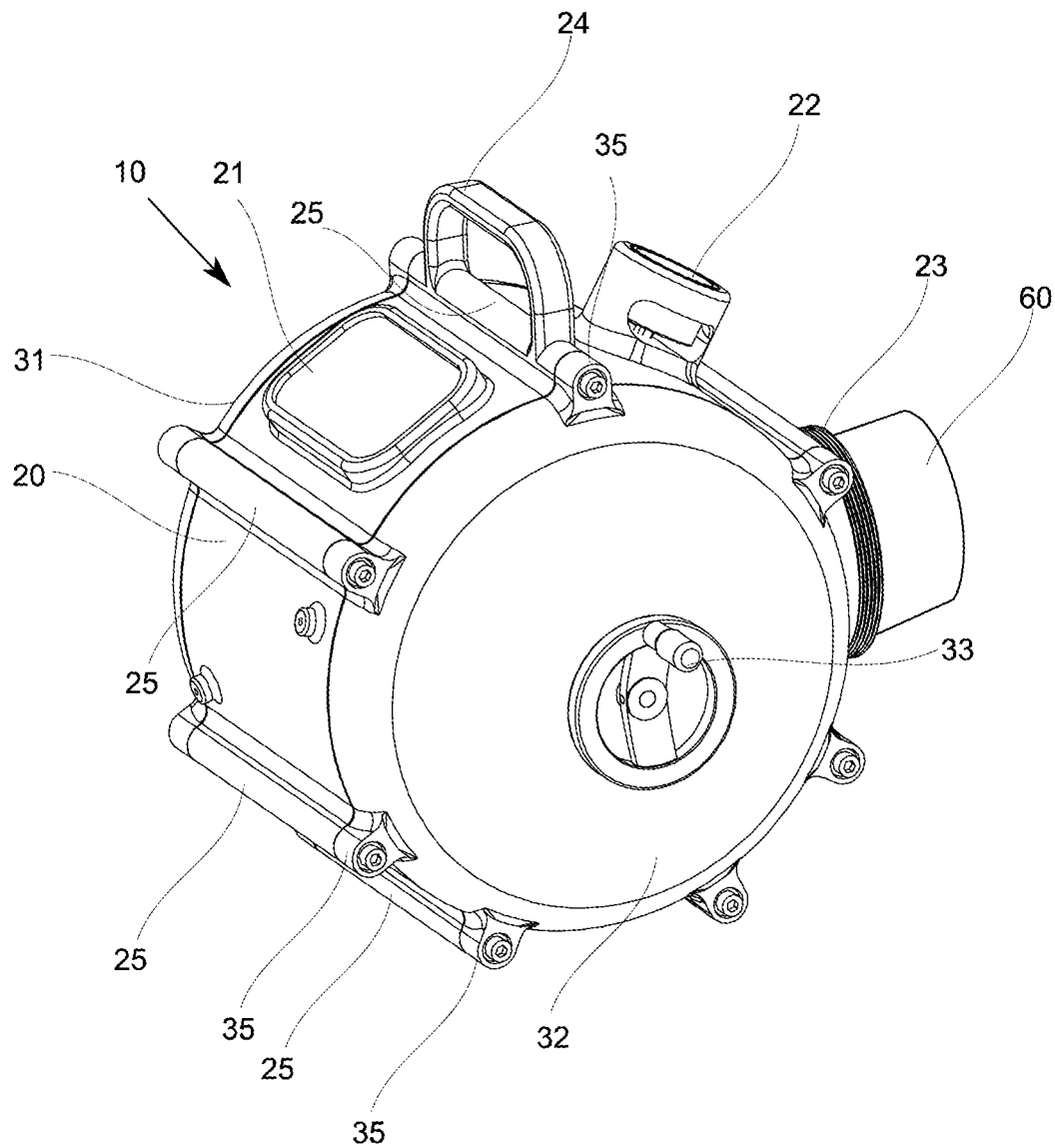
FIG. 1 is an isometric perspective view of a lining drum according to an embodiment of the present invention.

FIGS. 1-5 illustrate a lining drum 10 according to an embodiment of the present invention. The lining drum of this embodiment, preferably, includes a tubular body 20 that is open at both ends. The tubular body could also be closed at one end and have the opposite end being open. The tubular body also includes an inlet 22 on its peripheral surface for receiving compressed air and an outlet 23 for a liner 60 disposed inside the tubular body 20 to exit from the lining drum 10. Preferably, the tubular body 20 also includes an inspection window 21 that provides a view inside the lining drum during use of the lining drum so that the viewer can see how the liner rotates inside the tubular body as the liner is extrudes or moves through the outlet 23. Also, a handle 24 for carrying the lining drum 10 can be attached to the outside of the tubular body 20.

The lining drum 10 has at least one end piece, but in the depicted embodiment there are two end pieces 31, 32. Preferably, the two end pieces 31, 32 are removably attached to the tubular body 20 thereby closing the open ends of the tubular body. In one embodiment, one end piece is secured or fixed to the tubular body while the opposite end piece is removably attached to the tubular body. The tubular body 20 and the end pieces 31, 32 define a closed container that has the inlet 22 that is plugged by an air supply hose (not shown) for receiving compressed air and the outlet 23 through which the liner extends as the liner is moved into the pipe to be renovated when the lining drum 10 is in use. The air supply hose can thus be used to increase the air pressure inside the lining drum by supplying air into the lining drum via the inlet 22.

The lining drum 10 also has a rotatable shaft arrangement 51, 52 disposed inside the tubular body 20, preferably in the middle of the tubular body extending between centers of the open ends of the tubular body. The liner 60 is rolled up on the shaft 51 prior to the renovation process of the pipe. The shaft arrangement is preferably attached to the end pieces 31, 32 of the lining drum 10 so that the shaft arrangement extends inwardly from the end pieces 31, 32. The shaft arrangement is preferably rotatably attached to an end piece 31 with a bearing 54 so that parts of the shaft arrangement can rotate easily in relation to the end piece 31. More particularly, the shaft-arrangement preferably includes e.g. a hollow rotatable shaft 51 that extends inwardly from the center of the end piece 32 towards center of the opposing end piece 31. The elongated guide 52 is fixedly attached to the center of the opposing end piece 31 at the bearing 54 and extends inwardly towards the center of the end piece 32 so that the guide 52 is at least partially inserted inside the hollow rotatable shaft 51. However, the rotatable shaft 51 does not necessarily have to be hollow and the guide 52 may be attached to the opposing end piece 31 and has a cavity defined therein for receiving and accommodating an end of the rotatable shaft 51. The shaft arrangement ensures that the rotatable shaft 51 can be rotated to roll on and off the liner 60 and that the end pieces 31, 32 can be moved further apart from each other while maintaining the functionality of the shaft arrangement because the shaft 51 and guide 52 may axially slide relative to one another, as explained in detail below.

A crank 33 is preferably disposed outside the tubular body 20 and on the outside of the end piece 32. The crank 33 is fixed or connected to an end 56 of the rotatable shaft 51 of the shaft arrangement for rotating the rotatable shaft 51 of the shaft arrangement inside the tubular body 20. In other words, by rotating crank 33, the shaft 51 also rotates without rotating the end piece 32 or the end piece 31. A remote end portion 58 of the shaft 51 is in rotatable engagement with the bearing 54 so that when shaft 51 is rotated the end piece 31 remains stationary. Also, shaft 51 rotates relative to the guide 52 that is inserted into the remote end portion 58 of the shaft 51 because the guide 52 is preferably fixedly attached to the inside of the end piece 31 and dimensioned to be inserted into the hollow shaft 51.

The liner 60 to be installed into the pipe to be renovated may first be wound onto the rotatable shaft 51 by rotating the crank 33 and, correspondingly, the liner 60 may be unwound from the rotatable shaft 51 by rotating the crank in an opposite direction. As mentioned above, the liner 60 to be installed resides in the lining drum 10 and exits from the tubular body 20 through the outlet 23. First, an open end of the liner 60 is pulled inside out, i.e. inverted, over the outer surface of the outlet 23 and clamped tight against the outer surface of the outlet 23 so that the liner 60 can withstand the pressure increase inside the liner without releasing from the outlet 23.

Figure 3B:
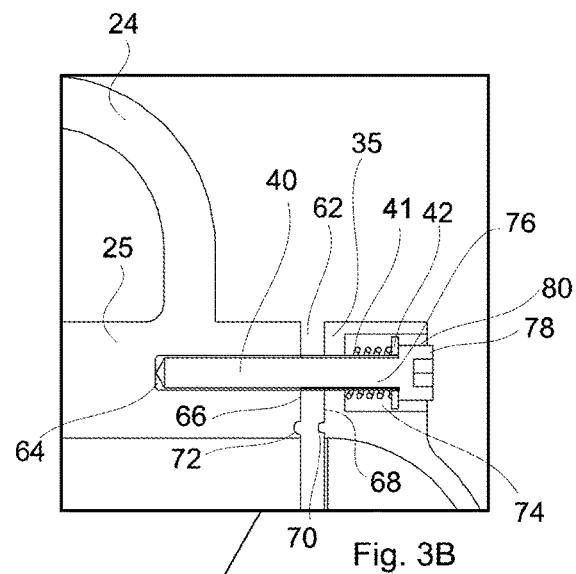
FIG. 3B is a detailed view of the section view of FIG. 3A.

In order to prevent an excessive or dangerous increase of air pressure inside the lining drum 10 a novel pressure relief system or expansion mechanism for the lining drum has been developed. It was surprisingly and unexpectedly discovered that at least one of the end piece can be removably or slidably attached to the lining drum and held tight to the lining drum 10 by a suitable biasing mechanism such as a spring, as described in more detail below. The lining drum 10 of the present invention has at least one end piece, such as end piece 32, equipped with a spring-loaded expansion mechanism that allows the end piece 32 to open slightly as pressure is building up inside the lining drum 10 thereby defining a small gap 62 (best seen in FIGS. 3A-3B) between the tubular body 20 and end piece 32. It is to be understood that the invention is not limited to having the expansion mechanism only on end piece 32 and that end piece 31 may also be equipped with the expansion mechanism. When the air pressure inside the lining drum 10 exceeds a defined limit, the force caused by the air pressure exceeds the opposite force or bias caused by the biasing device such as spring 41 so that air can leak out from the lining drum 10 through the gap 62 to reduce the air pressure inside the lining drum 10. The gap 62 is thus created by the axial movement of the shaft 51 relative to the guide 52 so that the end piece 32 moves away from the lining drum 10 to create the gap 62 therebetween. There is also an axial movement occurring inside end protrusion 35. FIGS. 2A-2B and FIGS. 3A-3B show the details of the protrusions 25, 35 at the handle 24 but the other protrusions located around the outside periphery of the tubular body 20 (best shown in FIG. 1) are identical. When the air pressure inside the lining drum 10 exceeds the limit, there is also and axial movement of the end protrusion 35 relative to an elongate body such as bolt 40 that is fastened to or screwed into an opening 64 defined in the protrusion 25 to hold the end-protrusion 35 (and thus the end piece 32) to the tubular body 20. An important feature is that the end-protrusion 35 may slide relative to the bolt 40 against the biasing force of the spring 41, when the pressure inside the lining drum 10 exceed the predetermined limit. FIG. 2B shows a contact surface 68 of the end-protrusion 35 sealingly engaging a sealing surface 66 of protrusion 25 so that an airtight seal is created therebetween. FIG. 3B shows the contact surface 68 being separated from sealing surface 66 so that the gap 62 is created therebetween and the spring 41 is compressed by the excessive air-pressure inside the lining drum 10.

Figure 3A:
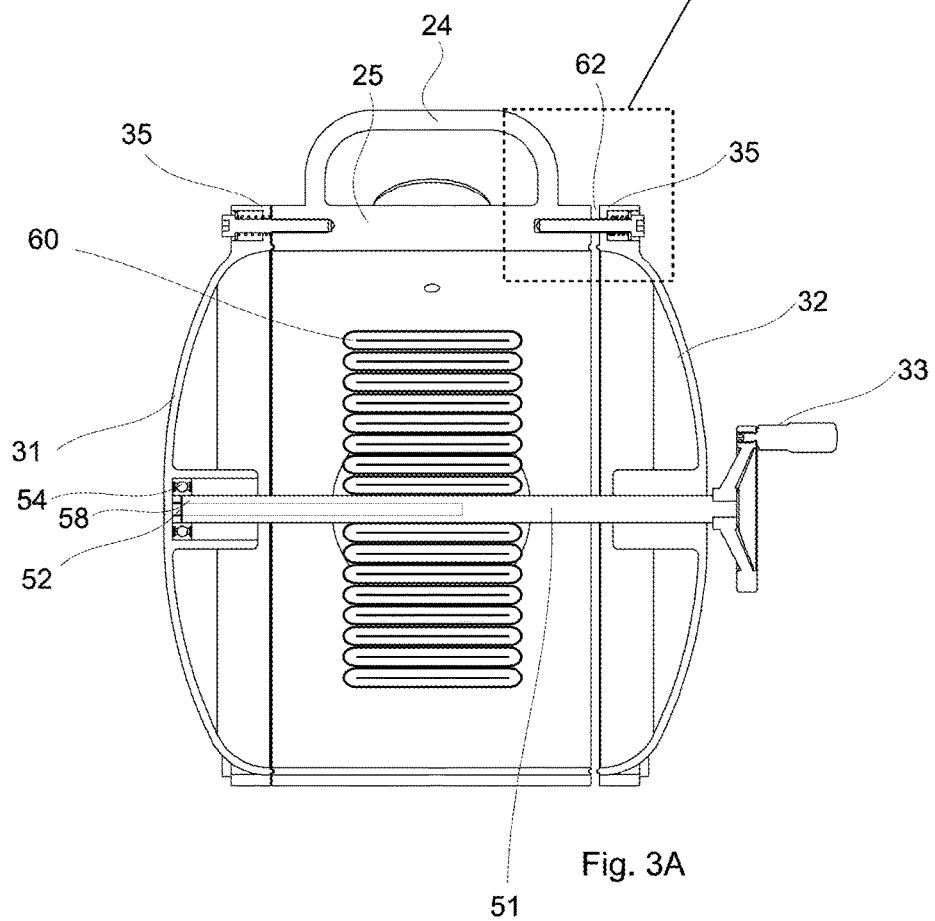
FIG. 3A is an elevational section view of the lining drum of the present invention shown in FIG. 2A in an open position.
Figure 4:
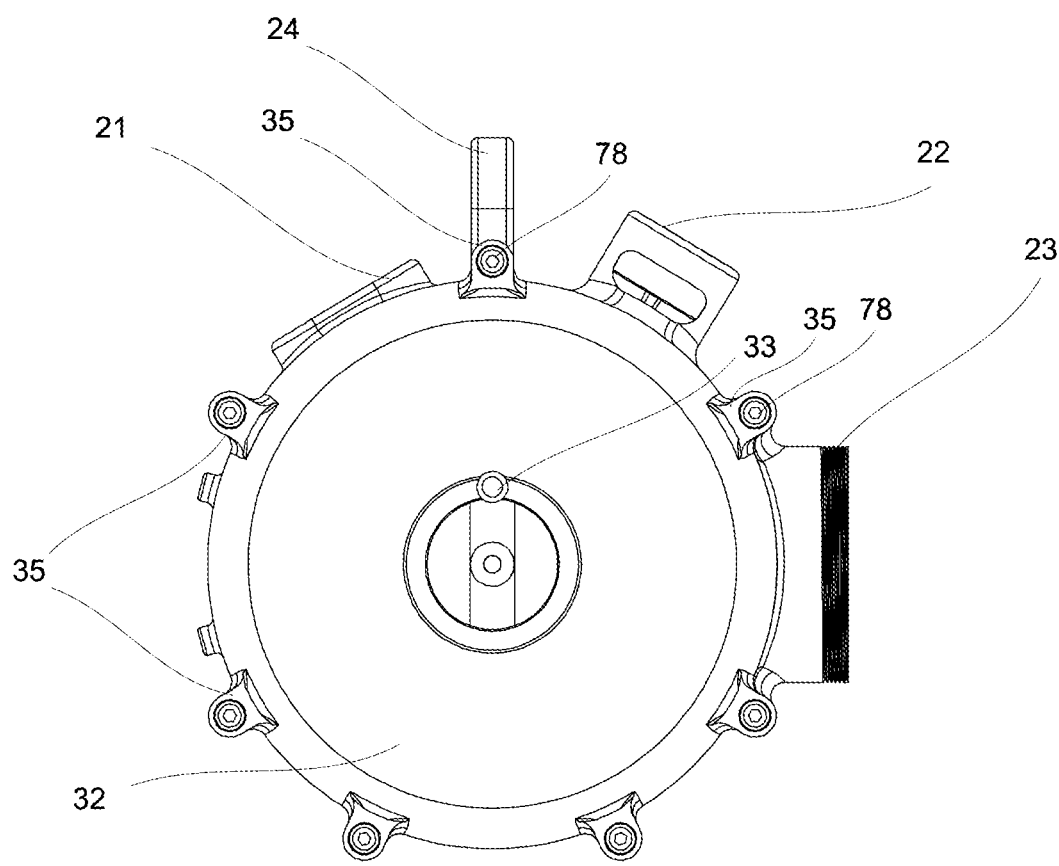
FIG. 4 is an elevational side view of the lining drum according to the present invention.
Figure 5:
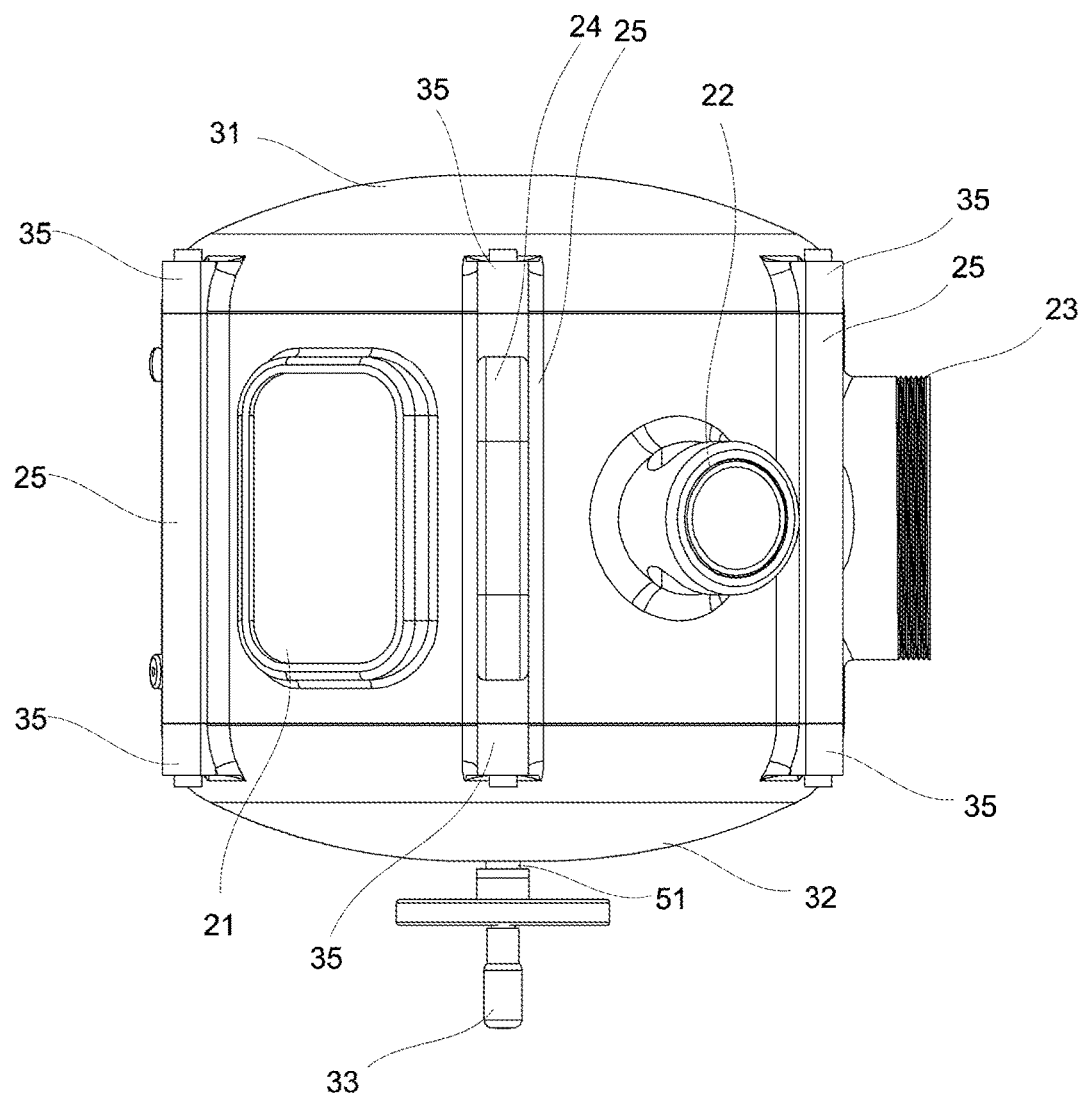
FIG. 5 is a top view of the lining drum according to the present invention.

When enough air has leaked out from the lining drum 10 and the pressure inside the lining drum 10 has decreased below the limit and so that the air pressure no longer exceeds the biasing force of the spring 41, the spring-loading of the expansion mechanism seals the surfaces 66 against surface 68 again and the leaking of air ends. In other words, when the air pressure is too high inside the lining drum 10, it overcomes the bias of the springs and moves the expansion mechanism from a closed position (FIGS. 2A-2B) to an open position (FIGS. 3A-3B). It is important that the biasing force of the spring 41 is strong enough to withstand the air pressure require to install the liner into the pipe to be renovated. The spring 41 should only give in to pressure that exceed the predetermined limit to prevent a dangerously high air pressure from developing inside the lining drum 10. When the air pressure decreases below the predetermine limit inside the lining drum 10, the biasing force of the spring 41 overcome the air pressure and moves the expansion mechanism from the open position back to the closed position. Preferably, a non-sticky seal 70 is disposed between the tubular body 20 and each of the end pieces 31, 32. The seal 70 may, for example, be a ring made out of silicone that fits into a groove 72 of the surface 66.

In the preferred embodiment, at least one and more preferably both end pieces 31, 32 are removably attached to the tubular body 20 with the spring-loaded expansion mechanisms, as illustrated in FIGS. 1-5. The end pieces 31, 32 can be e.g. blind flanges that have a convex shape on the outside and/or a concave shape on the inside of the end pieces and include bolt holes close to the periphery of the end pieces. In one embodiment, the end pieces have protrusions 35 that include holes for receiving bolts therein. The tubular body 20 also has protrusions 25 with threaded cavities so that bolts 40 can be screwed through the bolt holes of the end pieces and into the threaded cavities of the tubular body. The length of the bolts 40 should be long enough so that the bolts do not tighten the end pieces against the tubular body 20. A gap of 1 to 30 mm between the bolt-head and each end piece 31, 32 is preferable. The gap is preferably surrounded by end protrusion 35 of each end piece thereby defining a cavity 74 for the spring 41 within the end protrusion 35. A stem 76 of the bolt 40 goes through the spring 41 and preferably a washer 42 is used between the spring 41 and the bolt-head 78. It should be noted that the bolt-head 78 rests against the washer 42 and cannot slide through the washer 42. However, the end protrusion 35 has an opening 80 defined therein that is dimensioned to snugly but slidably receive the bolt head 78 so that the bolt head 78 may slide in the opening 80 as the lining drum 10 moves between the open and closed position and vice versa. Material, length and other properties of the spring 41 can be adjusted for defining the limit for air pressure which overcomes the spring bias and opens the expansion mechanism for releasing air from inside the lining drum. Preferably coil springs are used. When the expansion mechanism opens, air leaks through a large area and it is virtually impossible that a liner inside the lining drum would block this air leak completely. In an embodiment, a smaller blind flange having a spring-loaded expansion mechanism within an end piece can be used similarly but even the smaller expansion mechanism should be to be larger than the outlet 23 to make sure that the liner never blocks the leaking of air in case of excess pressure. In the embodiment shown in FIG. 1, the protrusions 25 and end protrusions 35 are shown as being located on the outside surface of the tubular body 20. It is also possible to locate the protrusions 25, 35 on an inside surface of the tubular body 20. It is also possible to locate the protrusions 25, 35 in the wall of the tubular body 20 so that a portion of the protrusions extends on radially inwardly on the inside and radially outwardly on the outside surfaces. The principles described above apply to all of the protrusions 25, 35 shown in FIGS. 1-5.

The present invention enables the step of predetermining a limit for air pressure inside the lining drum which should never be exceeded to avoid dangerously high pressure from building up inside the lining drum. This allows the use of different materials in the tubular body 20 and the end pieces 31, 32. In addition to aluminum, polymers and e.g. rubber can also be safely used. For example, the tubular body 20 and the end pieces 31, 32 can be made of transparent polycarbonate which gives the user an excellent view inside the lining drum 10. Threads and other critical parts can be reinforced with metal inserts when using softer materials.

While the present invention has been described in accordance with preferred compositions and embodiments, it is to be understood that certain substitutions and alterations may be made thereto without departing from the spirit and scope of the following claims.

I claim:

1. A lining drum, comprising:
    a tubular body having at least one open end, the tubular body having an inlet and an outlet defined therein;
    an end piece removably attached to the open end of the tubular body, the end piece being movable between a closed position to close the open end of the tubular body and an open position to open the open end of the tubular body;
    a rotatable shaft arrangement disposed inside the tubular body and extending from said end piece, the shaft arrangement having a shaft and a guide;
    a crank disposed outside the tubular body and fixed to the shaft arrangement for rotating the shaft of the shaft arrangement, and
    the end piece having a spring-loaded end-protrusion in operative engagement with a protrusion of the tubular body, the end piece being movable between a closed position and an open position by axially sliding the shaft relative to the guide against a biasing force of the spring-loaded end-protrusion, the end piece and the tubular body having a gap defined therein when the end piece is in the open position.

2. The lining drum of claim 1, wherein the tubular body has two open ends defined therein and the lining drum has a second end piece removably attached to the tubular body.

3. The lining drum of claim 2, wherein the second end piece is removably attached to the tubular body with a second spring-loaded end-protrusion.

4. The lining drum of claim 2, wherein the shaft is a hollow rotatable shaft extending from a center of the end piece towards a center of the second end piece, and the guide is fixedly secured to a center of the second end piece and extends towards the center of the end piece and the guide is at least partially inserted inside the hollow rotatable shaft.

5. The lining drum of claim 1, wherein the end piece is removably attached to the tubular body with the spring-loaded end-protrusion.

6. The lining drum of claim 1, wherein the spring-loaded end-protrusion is movably attached to the protrusion of the tubular body with a bolt, the bolt being axially movable relative to the spring-loaded end-protrusion, the bolt having a spring urging the end piece towards the tubular body.

7. The lining drum of claim 1, wherein a non-sticky seal is disposed between the tubular body and the end piece.

* * * * *